United States Patent [19]

Tomonaga

[11] 3,951,904

[45] Apr. 20, 1976

[54] ELECTROMAGNETIC WAVE ABSORBING MATERIAL CONTAINING CARBON MICROSPHERES

[75] Inventor: Atsushi Tomonaga, Tachikawa, Japan

[73] Assignees: Kureha Kagaku Kogyo Kabushiki Kaisha, Tokyo; Toyo Boseki Kabushiki Kaisha, Osaka, both of Japan

[22] Filed: Feb. 28, 1974

[21] Appl. No.: 446,798

[30] Foreign Application Priority Data

Mar. 7, 1973 Japan .............................. 48-26104

[52] U.S. Cl. ......................... 260/40 R; 260/2.5 EP; 260/37 EP; 260/42.46

[51] Int. Cl.² ......................................... C08L 67/00

[58] Field of Search ................ 260/28, 42.43, 42.46, 260/42.52, 37 EP, 40 R, 2.5 EP; 252/444; 264/29; 106/56, 97, 307; 423/449

[56] References Cited

UNITED STATES PATENTS

| | | | |
|---|---|---|---|
| 3,786,134 | 1/1974 | Amagi et al. | 264;423/29;449 |
| 3,830,740 | 8/1974 | Amagi et al. | 264/29 |
| 3,832,426 | 8/1974 | Malthouse et al. | 264/29 |

*Primary Examiner*—Lewis T. Jacobs

*Attorney, Agent, or Firm*—Lane, Aitken, Dunner & Ziems

[57] ABSTRACT

An electromagnetic wave absorbing material comprising as a conductive material hollow carbon microspheres which are prepared by the use of a coal-base or petroleum-base pitch material and which have a non-cohesive property with one another, and as a matrix a non-conductive material having a specific resistance of greater than $10^3 \Omega$ cm, the conductive material being mixed with the non-conductive material and the mixture being formed into moldings. The resultant composite moldings exhibit a satisfactory complex dielectric constant, so that the composite material is applicable, for example, as a waveguide microwave absorber, a microwave pollution preventive microwave absorber, a microwave absorber for microwave heating range, or a microwave absorber for an antenna.

9 Claims, 2 Drawing Figures

ELECTROMAGNETIC WAVE ABSORBING MATERIAL CONTAINING CARBON MICROSPHERES

FIELD OF THE INVENTION

This invention relates to a novel electromagnetic wave absorbing material.

BACKGROUND OF THE INVENTION

In general, it is desirable that material used as an electromagnetic wave absorber exhibit a complex dielectric constant in the operating frequency ranges. More specifically, the constant should have a relatively small real dielectric constant and a large dielectric loss factor in operating ranges. Accordingly, composite materials which contain a mixture of conductive material and non-conductive material are used in the manufacture of electromagnetic wave absorbers. The real dielectric constant of complex dielectric constant of the composite material increases in proportion to the weight of conductive material added. In contrast, the imaginary dielectric loss factor increases only slightly until the amount of conductive material in the composite is increased to a threshold concentration which is sufficient to permit contact among the individual particles of the conductive material. In short, the presence of conductive material in concentrations over the threshold amount generally results in an abrupt increase of the dielectric loss factor of the dielectric constant with a corresponding reduction in electric resistance.

In order to produce a composite material having the desired complex dielectric constant, only a small weight of a conductive material is used. This permits control of the specific conductance of the resultant composite material at a predetermined reduced value.

Electromagnetic wave absorbers which are now in wide use generally use carbon black as a conductive material and a synthetic resin matrix as a non-conductive material. However, carbon black particles are not uniform and tend to form agglomerates, thus making it difficult to form uniform mixtures of carbon black in the non-conductive material. Accordingly, these composite materials had local irregulartities in electric characteristics. Thus, it has been substantially difficult to increase the dielectric loss factor of the complex dielectric constant without inviting an increase of the real dielectric constant.

Under these circumstances, there has been a strong demand for an electromagnetic wave absorbing composite material which can exhibit the desired complex dielectric constant.

SUMMARY OF THE INVENTION

It is therefore an object of the present invention to provide a novel electromagnetic wave absorbing composite material having excellent electric characteristics.

Other and further objects and advantages of the present invention will become apparent from the following description.

The present invention is premised on the assumption that, if a conductive material is hollow and is mixed with a non-conductive matrix in a completely uniform manner to form a composite material, the local irregularities in electric characteristics of the resultant composite material will be eliminated. Therefore, the dielectric loss factor of the complex dielectric constant can be increased without increasing the real dielectric constant since the uniform mixture of the hollow conductive material and the non-conductive material allows the particles of conductive material to be efficiently contacted with each other even if they are present in a relatively small amount. Specifically, it has been found that a mixture of hollow carbon microspheres, having a non-cohesive or non-coagulative property, and a non-conductive matrix material, having a specific resistance greater than $10^3\Omega$ cm, can be molded into a composite material which has the carbon spheres uniformly mixed with the matrix material and has excellent electric characteristics as an electromagnetic wave absorbing material.

The electromagnetic wave absorbing composite material of the present invention is characterized in that said composite material is obtained by molding into a suitable shape a mixture of hollow carbon microspheres having a non-coagulative property and a non-conductive material having a specific resistance greater than $10^3\Omega$ cm.

DETAILED DESCRIPTION OF THE INVENTION

Figure 1:
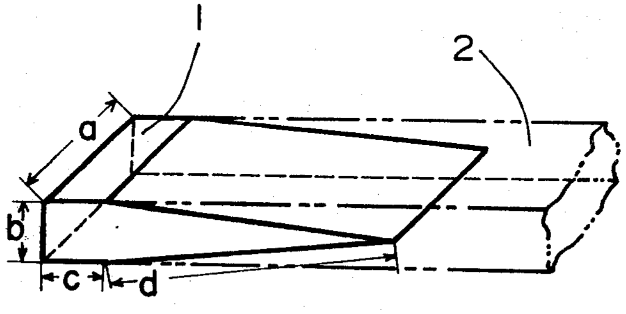
FIG. 1 is a view showing, by way of example, a waveguide (WRJ-10) employing the composite material of the invention as an electromagnetic wave absorbing material in a wedge form.

The hollow carbon microspheres useful in the present invention can be prepared by a method as disclosed in Japanese Pat. application No. 45625/1970 which corresponds to U.S. Pat. application Ser. No. 147,712, now U.S Pat. No. 3,786,134, assigned to the assignee of this application. That is, the microspheres can be prepared by uniformly mixing a high aromatic hydrocarbon hard pitch, which has a softening point of 60° – 350°C, a nitrobenzene-insoluble fraction of 0 – 25% by weight and a hydrogen/carbon ratio of 0.2 – 1.0, with an organic solvent which has a low boiling point and which is miscible with the pitch; dispersing the resultant mixture in water in the presence of a protective colloid to form fine particles or microspheres of the mixture rapidly heating the microspheres at a sufficient rate to cause them to foam into hollow pitch microspheres; infusibilizing the hollow pitch microspheres by treatment with an oxidative gas or oxidative liquid; and calcining the infusibilized microspheres at a temperature of 600°C – 2000°C in an inert atmosphere.

The resultant hollow carbon microspheres contain 99.9% or more carbon and are in the form of almost true spheres which do not agglomerate with each other. It will be noted, in this connection, that commercially available hollow carbon microspheres which are prepared from a phenol resin are unsuitable for the purpose of the present invention since they are hygroscopic and therefore tend to agglomerate.

The non-conductive material which is useful as a matrix for the composite material in the present invention may be, for example, a thermosetting resin such as an epoxy resin, an unsaturated polyester or the like, a thermoplastic resin such as polyethylene, polystyrene or the like, or ceramics such as cement, glass or the like. These non-conductive materials should have a specific resistance greater than $10^3\Omega$ cm.

The electromagnetic wave-absorbing material of the present invention is formed by molding a composite material which comprises the hollow carbon microspheres and the non-conductive matrix material.

The ratio of the microspheres to the non-conductive material in the composite is not critical. Where the composite material is used in the form of the thin plate, the microspheres may be used in a relatively great amount so as to raise the electromagnetic wave absorbing efficiency. While, where the composite material is employed as an electromagnetic wave absorber in the form of a plate having a great thickness, the microspheres may be used in a relatively small amount. In general, the microspheres are preferably mixed with the non-conductive material in an amount ranging 10 to 70 vol % of the non-conductive material.

The particle size of the microspheres useful in the present invention is also not critical, but is preferably within a range of 50 – 1000 $\mu$. Moreover, it is preferred that the wall thickness of the particles be within a range of 2 – 10 $\mu$. In order to more effectively carry out the uniform mixing operation and to avoid rupturing or break-down of the microspheres during mixing operations, it is desirable to use as a non-conductive material a thermosetting resin having excellent moldability such as an epoxy resin, an unsaturated polyester resin or the like.

The hollow microspherical carbon particles have a non-cohesive property and are freely rolled or moved due to their almost true spherical form when mixing them with the non-conductive material, thereby assuring uniform distribution of the carbon particles or spheres in the ultimate composite material. Furthermore, a predetermined amount of the hollow carbon microspheres may be distributed in different particle sizes to control the electrical conductivity of the composite material at a predetermined value. The composite material which contains the hollow microspherical carbon has a remarkably reduced weight (for example, when an epoxy resin is used as a non-conductive material, the resultant composite material has a specific gravity of 0.6 – 0.9) and is easy to machine. Accordingly, the composite material can be extremely advantageously used to form a large size electromagnetic wave-absorber which must be light weight and which can be machined into any desired shape by a simple operation depending upon the particular purpose for which the composite material is used.

The composite material or electromagnetic wave-absorbing material of the present invention has great practicability, particularly as a waveguide microwave absorber, a microwave pollution preventive microwave absorber, a microwave absorber for a microwave heating range or a microwave absorber for an antenna.

The present invention will be particularly illustrated in the following examples, which are shown by way of explanation only.

EXAMPLE 1

About 150 g of carbon hollow microspheres, which had a particle size of 75 – 150 $\mu$ and a wall thickness of 2 – 4 $\mu$ and which were calcined at 850°C were introduced into a glass container having an inner volume of 300cc. The container was vibrated to uniformly distribute the spheres therein and then evacuated.

Thereafter, 100 cc of a mixture of an epoxy resin, i.e., Epon No. 828 (produced by Shell), a hardening agent, i.e., Nadic Methyl Anhydride [A trademark for methylbicyclo (2.2.1) heptene-2,3-dicarboxylic anhydride isomers ($C_{10}H_{10}O_3$)] and a hardening catalyst, i.e., benzyldimethylamide, was introduced into the container in a mixing weight ratio 100 : 100 : 1. The resultant mixture was heated at 150°C for 10 hours for hardening to obtain a composite material composed of the microspheres and epoxy resin. The thus obtained composite material was formed into a wedge 1, as shown in FIG. 1, having a size of $a = 2.29$ cm, $b = 1.02$ cm, $c = 1$ cm and $d = 10$ cm. The wedge was inserted into a waveguide 2 (WRJ-10) for measuring a standing-wave ratio (V.S.W.R.) with use of an electromagnetic wave of 9000 MHz to obtain 1.01.

EXAMPLE 2

Example 1 was repeated to obtain a composite material except that hollow carbon microspheres which had a particle size of 150 – 250 $\mu$ and a wall thickness of 3 – 8 $\mu$ and which were calcined at 850°C were used and an unsaturated polyester was employed as a matrix. The complex dielectric constant of the composite material at 10000MHz had a real dielectric constant value of 38.4 and an dielectric loss factor value of 8.9. This complex dielectric constant is excellent since if an electromagnetic wave absorbing material having a real dielectric constant value of 39.0 and an dielectric loss factor value of 8.2 is bonded to a front surface of a metal plate having a thickness of 0.04 times the wavelength of an incident electromagnetic wave, it is theoretically possibly to have a zero the refractive index of absorbing material with regard to the electromagnetic wave.

This was proved by an experiment using the composite material in the form of a plate having a thickness of 1.2 mm and bonded to a front surface of a metal plate for measuring the refractive index at 10000 MHz. The reflactive index was less than 10%.

Figure 2:
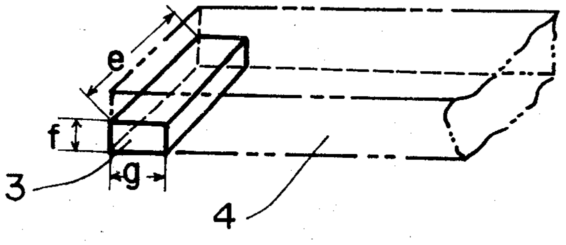
FIG. 2 is a view similar to FIG. 1 showing a waveguide (WRJ-10) employing the composite material of the invention as an electromagnetic wave absorbing material in a rectangular parallelepiped form.

Furthermore, the composite material was formed into a rectangular, parallelepiped structure 3, as shown in FIG. 2, having a size of $e = 2.29$ cm, $f = 0.55$ cm, and $g = 1$ cm. The parallelepiped structure was inserted into a guidewave (WRJ-10) for measuring a standing-wave ratio (V.S.W.R.) at 8000 – 9000 MHz to obtain a value of less than 1.03.

What is claimed is:

1. An electromagnetic wave absorbing material useful for absorbing waves of 8,000 to 10,000 MHz comprising hollow non-cohesive carbon microspheres having a particle size of 50 – 1000$\mu$ and a wall thickness of 2 – 10$\mu$ uniformly mixed in a matrix comprising a non-conductive thermosetting or thermoplastic resin having a specific resistance of greater than $10^3\Omega$ cm.

2. An electromagnetic wave-absorbing material according to claim 1, wherein said microspheres are prepared by uniformly mixing a high aromatic hard pitch, which has a softening point of 60° – 350°C, a nitrobenzene-insoluble fraction of 0 – 25%, and a hydrogen/carbon ratio of 0.2 – 1.0, with an organic solvent which has a low melting point and which is miscible with said pitch, dispersing the resultant mixture in water in the presence of a protective colloid to form fine microspheres of the mixture, heating the microspheres at a sufficient rate to cause said fine microspheres to foam into hollow pitch microspheres, infusibilizing the hollow pitch microspheres by treatment with an oxidative gas or oxidative liquid, and calcining the infusibilized microspheres at a temperature of 600°C – 2000°C in an inert atmosphere.

3. An electromagnetic wave-absorbing material according to claim 1, wherein said non-conductive material is a thermosetting resin,

4. An electromagnetic wave-absorbing material according to claim 3, wherein said thermosetting resin is selected from the group consisting of an epoxy resin and an unsaturated polyester resin.

5. An electromagnetic wave-absorbing material according to claim 1, wherein said microspheres have a particle size of 75 – 150 $\mu$.

6. An electromagnetic wave-absorbing material according to claim 5, wherein said microspheres have a wall thickness of 2 – 4 $\mu$.

7. An electromagnetic wave-absorbing material according to claim 1, wherein said microspheres have a particle size of 150 – 250 $\mu$.

8. An electromagnetic wave-absorbing material according to claim 7, wherein said microspheres have a wall thickness of 3 – 8 $\mu$.

9. An electromagnetic wave-absorbing material according to claim 1, wherein said microspheres are present in an amount of from 10 – 70% by volume of said non-conductive material.

* * * * *